J. F. WOLLESEN.
VARIABLE SPEED TRANSMISSION.
APPLICATION FILED MAY 2, 1918.

1,313,036.

Patented Aug. 12, 1919.
4 SHEETS—SHEET 1.

Inventor
Jacob F. Wollesen
By Arthur L. Slee
Atty.

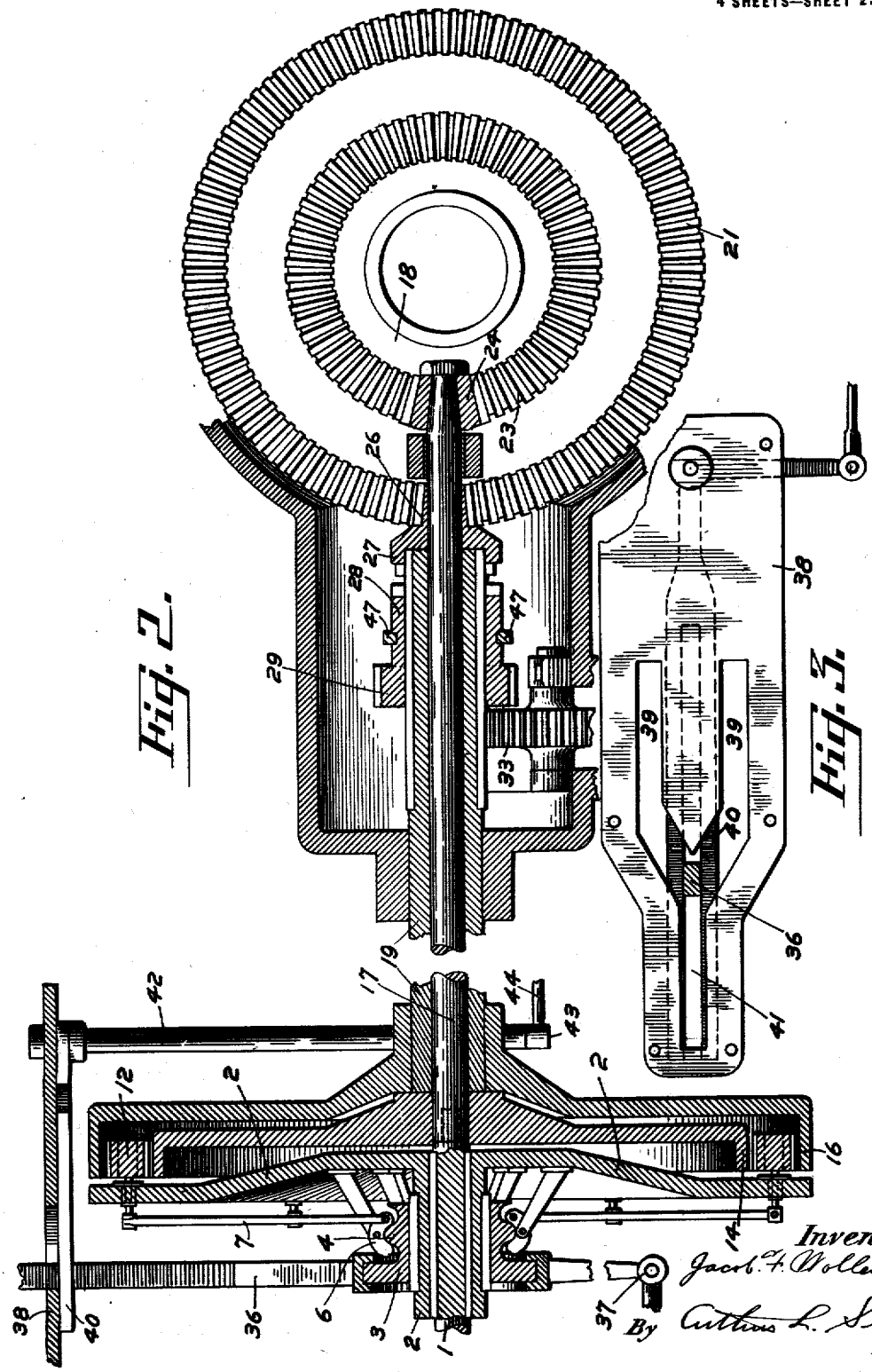

J. F. WOLLESEN.
VARIABLE SPEED TRANSMISSION.
APPLICATION FILED MAY 2, 1918.

1,313,036.

Patented Aug. 12, 1919.
4 SHEETS—SHEET 3.

Inventor
Jacob F. Wollesen

By Arthur L. Slee
Atty.

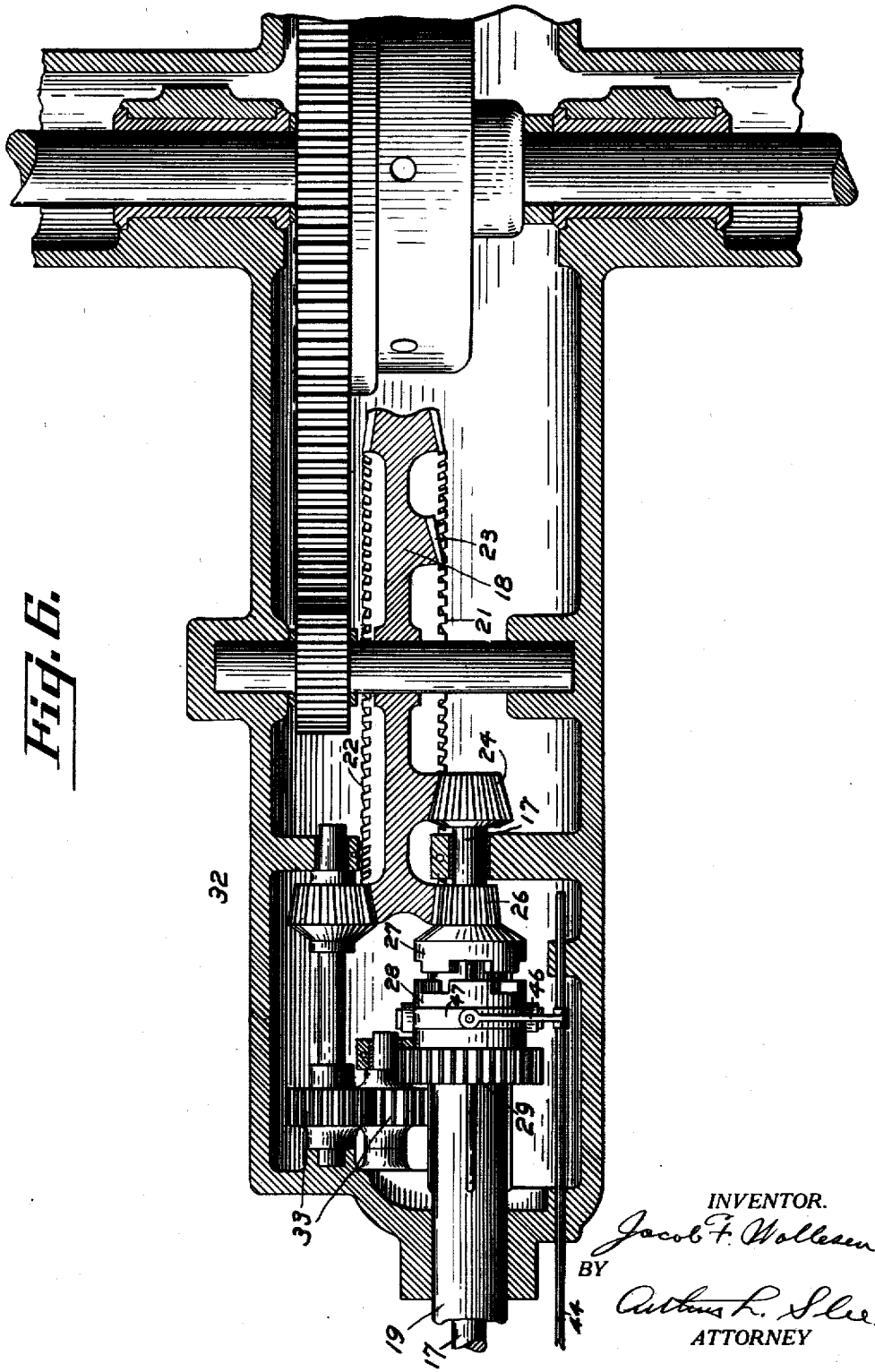

UNITED STATES PATENT OFFICE.

JACOB F. WOLLESEN, OF LOCKWOOD, CALIFORNIA.

VARIABLE-SPEED TRANSMISSION.

1,313,036.  Specification of Letters Patent.  Patented Aug. 12, 1919.

Application filed May 2, 1918. Serial No. 233,294.

*To all whom it may concern:*

Be it known that I, JACOB F. WOLLESEN, a citizen of the United States, residing at Lockwood, in the county of Monterey and State of California, have invented a new and useful Improvement in Variable-Speed Transmission, of which the following is a specification.

My invention relates to improvements in a variable speed transmission for motor vehicles and the like wherein a nested sleeve and counter shaft operate in conjunction with suitable clutches and gearing to produce a direct drive on either one of two speeds or gear ratios; and the objects of my invention are—

First, to provide an improved variable speed transmission for motor vehicles and the like wherein either one of two speeds may be produced through a direct drive from the driving shaft to a driven element;

Second, to provide improved means for connecting either drive directly to a driving shaft;

Third, to provide an improved transmission for motor vehicles and the like having two speeds, each one being driven direct from the driving shaft.

I accomplish these several features by means of the device disclosed in the drawings forming a part of the present specification wherein like characters of reference are used to designate similar parts throughout the said specification and drawings, and in which—

Fig. 2 is a broken vertical longitudinal sectional view, taken on line 2—2 of Fig. 5 in the direction indicated;

Fig. 3 is a broken plan view of the controlling and operating mechanism;

Fig. 6 is a horizontal sectional view disclosing a modified form of the invention.

Figure 1:
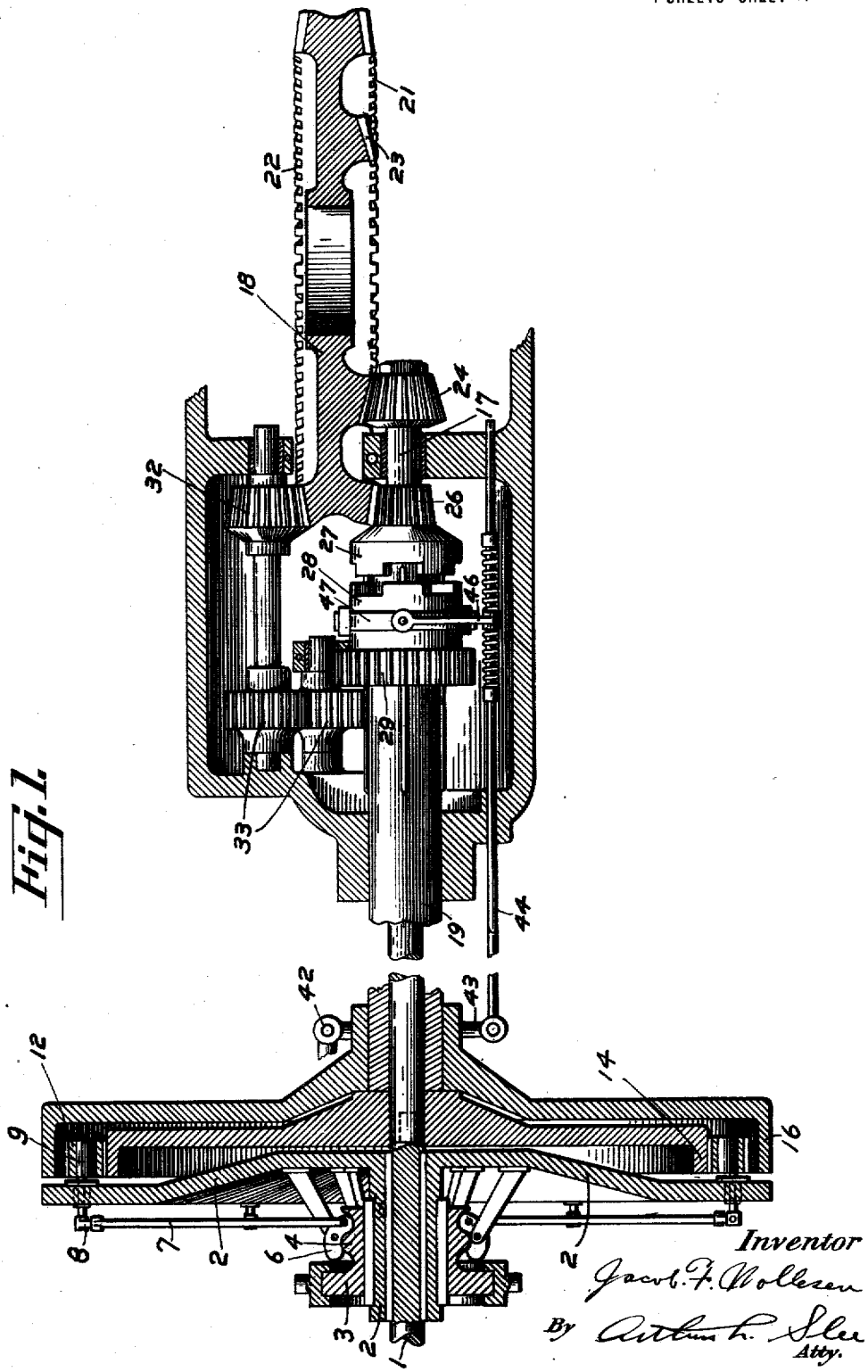
Figure 1 is a broken horizontal, longitudinal sectional view of my improved device.
Figure 4:
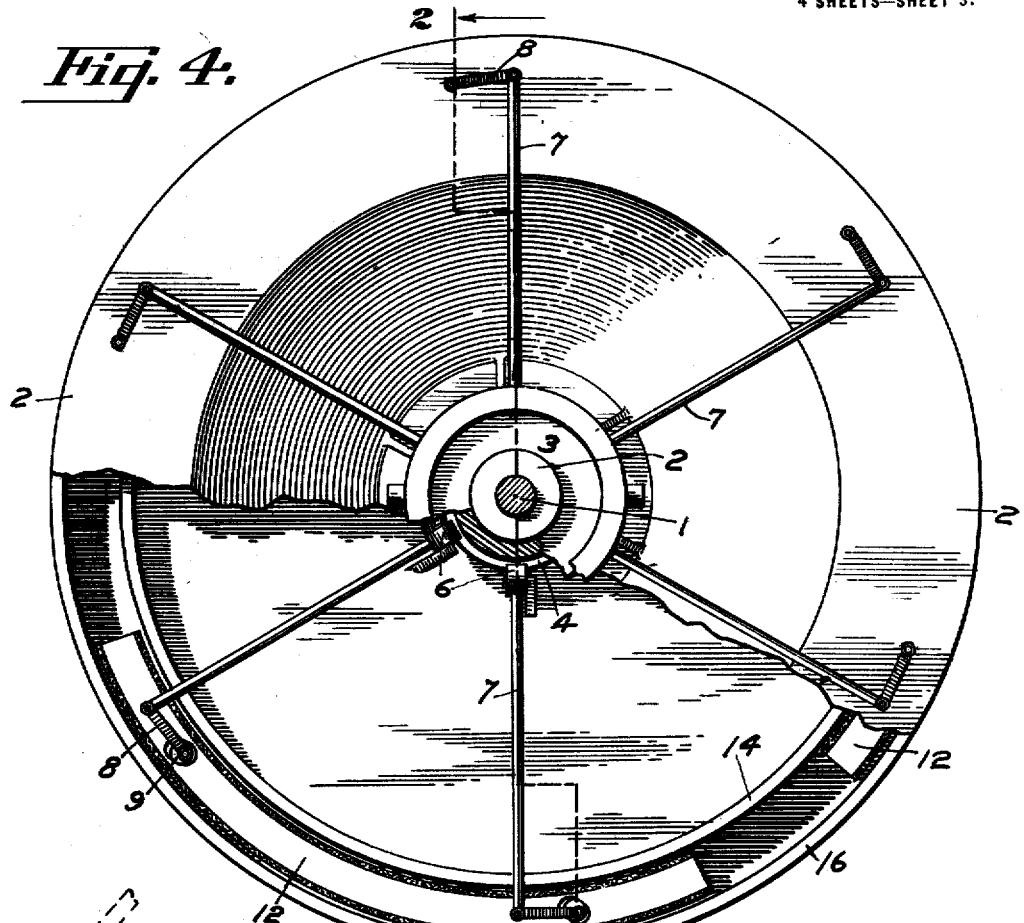
Fig. 4 is a left hand elevation of the double clutch shown in Figs. 1 and 2.
Figure 5:
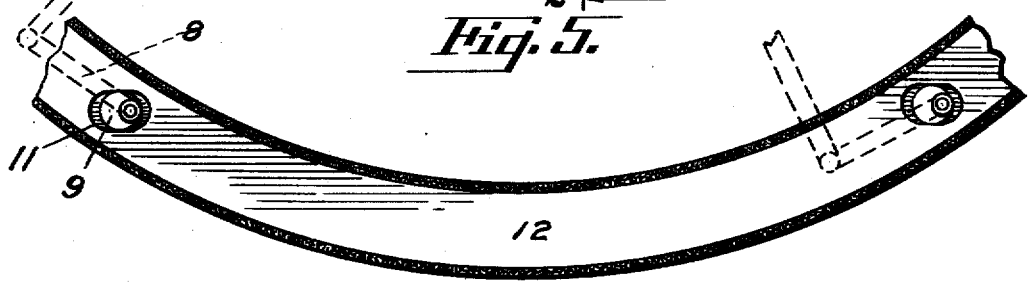
Fig. 5 is an enlarged detailed view of a portion of the double clutch.

Referring to the drawings the numeral 1 is used to designate a driving shaft having a disk 2 secured to the end thereof. Upon the hub of the disk 2 is feathered a sleeve 3 having a beveled annular flange 4 arranged to engage opposite ends of arcuate plates 6 pivotally mounted upon the disk 2 and having connecting rods 7 in turn actuating arms 8 secured to cams 9 rotatably mounted near the periphery of the disk 2.

The cams 9 engage slots 11 within arcuate shoes 12 mounted between a pair of nested annular flanges 14 and 16 secured to the ends of a counter shaft 17, extending from a driven element 18 to the driving shaft 1, and a sleeve 19, rotatably mounted upon the counter shaft 17, respectively.

The driven element 18 is provided with oppositely faced gears 21 and 22 on opposite sides of said element 18 and of the same diameter, and a gear 23 of smaller diameter, the purpose of which will hereinafter be more fully described.

A pinion 24 meshes with the gear 23 and is secured to the counter shaft 17 to produce a direct drive between the driving shaft 1 and the driven element 18 at that particular speed ratio.

A second pinion 26, having a clutch member 27, is rotatably mounted upon the counter shaft 17, said clutch member 27 overhanging the end of the sleeve 19 so as to be engageable with a similar clutch member 28 feathered on the sleeve 19 and secured to a gear 29 also feathered on said sleeve 19.

The remaining oppositely faced gear 22 on the driven element 18 is driven by a third pinion 32 operatively connected to reversing gears indicated in general by the numeral 33, one of said gears 33 being engageable by the feathered gear 29 in a manner hereinafter more fully set forth.

The sleeve 3 feathered upon the hub of the disk 2 is moved by an operating or controlling lever 36 fulcrumed as at 37 and passing upwardly through a plate 38 having a Y-shaped slot 39 therein. Below the plate 38 I have provided a bifurcated lever 40, having a longitudinally disposed slot 41 therein and secured to a vertically disposed shaft 42 having an arm 43 on the lower end thereof. A shifting rod 44 has one end connected to the arm 43 and the other end of said rod 44 is connected to a yoke 46 engaging a collar 47 rotatably mounted upon the feathered clutch member 28 and gear 29 on the sleeve 19.

In operation, when the lever 36 is in neutral position, as disclosed in Fig. 2 of the drawings, the annular flange 4 of the sleeve 3 is midway between the ends of the arcuate members 6 pivotally mounted upon the disk 2 and the arcuate shoes 12 lie midway between the nested annular flanges 14 and 16 of the counter shaft 17 and sleeve 19, respectively, thereby engaging neither flange 14 or 16. While in this position the bifurcated lever 40 is also in neutral position as disclosed in Fig. 3 of the drawings and the gear 29 and clutch member 28 secured thereto are held from engagement, with, or midway between the reversing gears 33 and the clutch member 27 of the second pinion 26 respectively.

To make a direct connection of the driving shaft 1 with the low speed gear 23 the lever 36 is moved into the stem of the Y-shaped slot 39 of the plate 38 which action does not operate the bifurcated lever 40 thereby retaining the gear 29 and clutch member 28 in neutral position as above described. But such movement of the lever 36 moves the sleeve 3 and annular flange 4 thereon away from the disk 2 thereby causing said flange 4 to engage and move outwardly the free ends of the arcuate members 6 thereby operating the cams 9 to move the arcuate shoes 12 against the inner flange 14 to rotate the counter shaft 17, first mentioned pinion 24 and the smaller gear 23 of the driven element 18, to produce a directly driven low speed.

By moving the lever 36 into the lower branch of the Y-shaped slot 39 of the plate 38 the bifurcated lever 40 is first operated by such movement to shift the clutch member 28 into engagement with the clutch member 27 of the second mentioned pinion 26 and the sleeve 3 and annular flange 4 thereon are moved toward the disk 2 to operate the cams 9 and move the arcuate shoes 12 toward the outer flange 16 connected to the sleeve 19 thereby rotating said flange 16, sleeve 19, clutches 28 and 27 and the pinion 26 which rotates the gear 21 on the driven element 18 to produce a directly driven high speed.

To operate the reverse gears the lever 36 must first be moved to neutral position as disclosed in Fig. 3 of the drawings before said lever can be moved into the upper side of the Y-shaped slot 39 of the plate 38 which movement will disengage the clutch members 27 and 28. By moving said lever 36 into the said upper side of the slot 39 the bifurcated lever 40 will be moved to its other extreme position which movement will first shift the gear 29, feathered onto the sleeve 19, into engagement with the reversing gears 33 and then move the sleeve 3 and annular flange 4 to operate the cams 9 to again move the arcuate shoes 12 outward to engage the outer flange 16 and thereby rotate the sleeve 19, gear 29, reversing gears 33 and last mentioned pinion 32 and the remaining oppositely faced gear 22 of the driven element 18 thereby reversing the direction of rotation of said driven element 18.

It is obvious from the foregoing that I have provided an improved variable speed transmission wherein each of the speeds is directly driven from the driving shaft. It is also obvious that I have provided improved means whereby the lever must be returned to neutral position before moving from either high or low speed to reverse.

Having thus described my invention what I claim as new and desire to secure by Letters Patent is—

1. A variable speed transmission comprising a driving shaft; a driven element; a pair of gears of different diameters mounted upon the driven element; a counter shaft extending from the driving shaft to the driven element; a pinion on the counter shaft meshing with one of the gears on the driven element; a sleeve rotatably mounted upon the counter shaft; a second pinion meshing with the other gear on the driven element; and means for connecting either the counter shaft or the sleeve with the driving shaft and for simultaneously connecting the second pinion with the sleeve when said sleeve is connected to the driving shaft.

2. A variable speed transmission comprising a driving shaft; a driven element; a pair of oppositely faced gears of the same diameter on the driven element; a third gear of smaller diameter on the driven element; a counter shaft extending from the driven element to the driving shaft; a sleeve rotatably mounted upon the counter shaft and extending the length thereof; a pinion meshing with the smaller gear on the driven element and secured to the counter shaft; a second pinion meshing with one of the larger gears; a third pinion meshing with the oppositely faced gear on the driven element; reversing gears operatively connected with the last mentioned pinion; and means for connecting and disconnecting the counter shaft to the driving shaft to produce a direct drive to the smaller gear and pinion therefor when in one position and for connecting the second mentioned pinion to the sleeve and the sleeve to the driving shaft in a second position, and for connecting the reversing gears with said sleeve and said sleeve to the driving shaft in a third position.

3. A variable speed transmission comprising a driving shaft; a driven element; a pair of oppositely faced gears on either side of the driven element; a third gear of smaller diameter on the driven element; a counter shaft extending from the driven element to the driving shaft; a sleeve rotatably mounted upon the counter shaft; a pair of nested annular flanges connected to the sleeve and counter shaft and adjacent the driving shaft; a pinion meshing with the smaller gear on the driven element and secured to the counter shaft; a second pinion meshing with one of the oppositely faced gears and rotatably mounted upon the sleeve and counter shaft; a third pinion meshing with the remaining oppositely faced gear; reversing gears connected to the last mentioned pinion; and means for connecting the annular flange on the counter shaft with the driving shaft to produce a direct drive from the driving shaft to the smaller gear when in one position, for connecting the second mentioned pinion with the sleeve and the flange on the sleeve with the driving shaft when in a second position, and for disconnecting the second mentioned pinion from and connecting the reversing gears with the sleeve and the flange on said sleeve with the driving shaft when in a third position.

4. A variable speed transmission comprising a driving shaft; a driven element; a pair of oppositely faced gears on either side of the driven element; a third gear of smaller diameter on the driven element; a counter shaft extending from the driven element to the driving shaft; a sleeve rotatably mounted upon the counter shaft; a pair of nested annular flanges connected to the sleeve and counter shaft and adjacent the driving shaft; a pinion meshing with the smaller gear on the driven element and secured to the counter shaft; a second pinion meshing with one of the oppositely faced gears and rotatably mounted upon the countershaft; a third pinion meshing with the remaining oppositely faced gear; reversing gears connected to the last mentioned pinion; and means for connecting the annular flange on the counter shaft with the driving shaft to produce a direct drive from the driving shaft to the smaller gear when in one position, for connecting the second mentioned pinion with the sleeve and the flange on the sleeve with the driving shaft when in a second position, and for disconnecting the second mentioned pinion from and connecting the reversing gears with the sleeve and the flange on said sleeve with the driving shaft when in a third position; and for disconnecting the reversing gears and second mentioned pinion from the sleeve and both flanges from the driving shaft when in a neutral position.

5. A variable speed transmission comprising a driving shaft; a driven element; a pair of oppositely faced gears of equal diameter mounted upon the driven element; a counter shaft extending from the driven element to the driving shaft; a sleeve rotatably mounted upon the counter shaft; a pair of nested annular flanges secured to the sleeve and counter shaft respectively and adjacent the driving shaft; a pinion secured to the counter shaft and meshing with the smaller gear on the driven element; a second pinion meshing with one of the oppositely faced gears and having a clutch member formed integral therewith; a gear having a clutch member thereon and feathered to the sleeve; a third pinion meshing with the remaining oppositely faced gears on the driven element; reversing gears connected to the last mentioned pinion; and means for connecting the annular flange on the counter shaft with the driving shaft when in one position, for connecting the flange on the sleeve and simultaneously moving the gear and clutch feathered on the sleeve to connect said clutch with the clutch member on the second mentioned pinion when in a second position, and for disconnecting said clutches and moving the feathered gear into engaging relation with the reversing gears when in a third position.

6. A variable speed transmission comprising a driving shaft; a driven element; a pair of oppositely faced gears of equal diameter mounted upon the driven element; a counter shaft extending from the driven element to the driving shaft; a sleeve rotatably mounted upon the counter shaft; a pair of nested annular flanges secured to the sleeve and counter shaft respectively and adjacent the driving shaft; a pinion secured to the counter shaft and meshing with the smaller gear on the driven element; a second pinion meshing with one of the oppositely faced gears and having a clutch member formed integral therewith; a gear having a clutch member thereon and feathered to the sleeve; a third pinion meshing with the remaining oppositely faced gears on the driven element; reversing gears connected to the last mentioned pinion; and means for connecting the annular flange on the counter shaft with the driving shaft when in one position, for connecting the flange on the sleeve and simultaneously moving the gear and clutch feathered on the sleeve to connect said clutch with the clutch member on the second mentioned pinion when in a second position, and for disconnecting said clutches and moving the feathered gear into engaging relation with the reversing gears when in a third position; and for disconnecting both flanges from the driving shaft and the feathered gear and clutch from the second mentioned pinion and reversing gears when in neutral position.

In witness whereof I hereunto set my signature.

JACOB F. WOLLESEN.